United States Patent
Bakopoulos et al.

(10) Patent No.: US 11,630,369 B2
(45) Date of Patent: Apr. 18, 2023

(54) GENERATION OF AN OPTICAL PAM-4 SIGNAL IN A MACH-ZEHNDER MODULATOR

(71) Applicant: Mellanox Technologies, Ltd., Yokneam (IL)

(72) Inventors: Paraskevas Bakopoulos, Ilion (GR); Nikolaos (Nikos) Argyris, Zografou (GR); Boaz Atias, Maale Adumim (IL); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/405,101

(22) Filed: Aug. 18, 2021

(65) Prior Publication Data
US 2023/0018578 A1 Jan. 19, 2023

(30) Foreign Application Priority Data
Jul. 19, 2021 (GR) .............................. 20210100483

(51) Int. Cl.
*G02F 1/21* (2006.01)
*G02F 1/225* (2006.01)

(52) U.S. Cl.
CPC ............ *G02F 1/212* (2021.01); *G02F 1/2257* (2013.01)

(58) Field of Classification Search
CPC .......... G02F 1/212; G02F 1/2257; G02F 1/01; G02F 1/0102; G02F 1/011; G02F 1/025; G02F 1/035; G02F 1/225
See application file for complete search history.

(56) References Cited

U.S. PATENT DOCUMENTS 10,078,232 B1 * 9/2018 Vermeulen ............ G02F 1/2257
10,895,797 B2 * 1/2021 Cavaliere ............ H04L 25/4917
11,397,363 B2 * 7/2022 Kawakami ......... H04B 10/5053

OTHER PUBLICATIONS

J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4,.
K. Yonenaga and S. Kuwano, "Dispersion-Tolerant Optical Transmission System Using Duobinary Transmitter and Binary Receiver," IEEE J. Lightwave Technol,, vol. 15, No. 8, pp. 1530-1537, 1997.

* cited by examiner

*Primary Examiner* — John Bedtelyon
(74) *Attorney, Agent, or Firm* — Moore & Van Allen PLLC; Michael M. McCraw

(57) ABSTRACT

Embodiments are disclosed for generating an optical Pulse Amplitude Modulation 4-level (PAM-4) signal from bandwidth-limited duobinary electrical signals in a Mach-Zehnder modulator. An example system includes an MZM structure that comprises a first waveguide interferometer arm structure associated with a first semiconductor device and a second waveguide interferometer arm structure associated with a second semiconductor device. A polybinary electrical signal is applied to or between the first semiconductor device and the second semiconductor device to convert an input optical signal provided to the MZM structure into an optical PAM-4 signal.

19 Claims, 7 Drawing Sheets

GENERATION OF AN OPTICAL PAM-4 SIGNAL IN A MACH-ZEHNDER MODULATOR

CROSS-REFERENCE TO RELATED APPLICATIONS

This application claims priority to Greek Application No. 20210100483, filed Jul. 19, 2021, the content of which is hereby incorporated by reference herein in its entirety.

TECHNOLOGICAL FIELD

Embodiments of the present invention relate generally to optical communications such as, for example, short-reach optical communications.

BACKGROUND

Optical communications have fundamentally enabled many advances in networks over the last decades. For example, because information no longer needs to be processed at the place where it has been harvested or generated, information can be transported to dedicated spaces for computation. As a result, cloud computing and edge computing are enabled and have changed the landscape of the Internet. The transfer of information between data centers or high-performance computing clusters (HPC), or intra-data center or intra-HPC, usually makes use of optical communication systems that require laser sources for generating the light channels. The light conveying the information can be generated either through external modulators (e.g., Mach-Zehnder modulators, micro-ring modulators, externally modulated lasers (EMLs) or directly by the same device that generates the light (e.g., directly modulated lasers (DMLs)) or vertical cavity surface emitting lasers (VCSELs)). However, Applicant has identified a number of deficiencies and problems associated with Mach-Zehnder modulators for optical communications. Through applied effort, ingenuity, and innovation, many of these identified problems have been solved by developing solutions that are included in embodiments of the present disclosure, many examples of which are described in detail herein.

BRIEF SUMMARY

Example embodiments described herein disclose systems and methods for generating an optical Pulse Amplitude Modulation 4-level (PAM-4) signal from bandwidth-limited duobinary electrical signals in a Mach-Zehnder modulator. The details of some embodiments of the subject matter described in this specification are set forth in the accompanying drawings and the description below. Other features, aspects, and advantages of the subject matter will become apparent from the description, the drawings, and the claims.

In an embodiment, a system includes a Mach-Zehnder modulator (MZM) structure. The MZM structure comprises a first waveguide interferometer arm structure associated with a first semiconductor device. The MZM structure also comprises a second waveguide interferometer arm structure associated with a second semiconductor device. In one or more embodiments, a polybinary electrical signal is applied to or between the first semiconductor device and the second semiconductor device to convert an input optical signal provided to the MZM structure into an optical PAM-4 signal.

In another embodiment, system includes a first MZM structure, a second MZM structure, and a bias controller. The first MZM structure comprises a first waveguide interferometer arm structure associated with a first semiconductor device. The first MZM structure also comprises a second waveguide interferometer arm structure associated with a second semiconductor device. The second MZM structure comprises a third waveguide interferometer arm structure associated with a third semiconductor device. The second MZM structure also comprises a fourth waveguide interferometer arm structure associated with a fourth semiconductor device. The bias controller is configured to apply a bias voltage to the first semiconductor device, the second semiconductor device, the third semiconductor device, and the fourth semiconductor device to configure the first MZM structure and the second MZM structure at a null operating point.

In some embodiments, the system further comprises a bias electrode structure configured to adjust phase between a first optical duobinary signal provided by the first MZM structure and a second optical duobinary signal provided by the second MZM structure to facilitate generation of an optical PAM-4 signal.

In some embodiments, a first duobinary electrical signal is applied to or between the first semiconductor device and the second semiconductor device of the first MZM structure to convert a first portion of an input optical signal provided to the first MZM structure into the first optical duobinary signal. Furthermore, in some embodiments, a second duobinary electrical signal is applied to or between the third semiconductor device and the fourth semiconductor device of the second MZM structure to convert a second portion of the input optical signal provided to the second MZM structure into the second optical duobinary signal.

In some embodiments, the system further comprises an optical splitter configured to split the input optical signal into the first portion of the input optical signal provided to the first MZM structure and the second portion of the input optical signal provided to the second MZM structure.

In some embodiments, the system further comprises an optical combiner configured to combine the first optical duobinary signal and the second optical duobinary signal into the optical PAM-4 signal.

In another embodiment, system includes a first MZM structure, a second MZM structure, and a bias electrode structure. The first MZM structure comprises a first waveguide interferometer arm structure associated with a first semiconductor device. The first MZM structure also comprises a second waveguide interferometer arm structure associated with a second semiconductor device. In one or more embodiments, a first duobinary electrical signal is applied to or between the first semiconductor device and the second semiconductor device to convert a first portion of an input optical signal provided to the first MZM structure into a first optical duobinary signal. The second MZM structure comprises a third waveguide interferometer arm structure associated with a third semiconductor device. The second MZM structure also comprises a fourth waveguide interferometer arm structure associated with a fourth semiconductor device. In one or more embodiments, a second duobinary electrical signal is applied to or between the third semiconductor device and the fourth semiconductor device to convert a second portion of the input optical signal provided to the second MZM structure into a second optical duobinary signal. The bias electrode structure is configured to adjust phase between the first optical duobinary signal associated with the first MZM structure and the second optical duobinary signal associated with the second MZM structure to facilitate generation of an optical PAM-4 signal.

In some embodiments, the system further comprises a bias controller configured to apply a bias voltage to the first semiconductor device, the second semiconductor device, the third semiconductor device, and the fourth semiconductor device to configure the first MZM structure and the second MZM structure at a null operating point.

In some embodiments, the first optical duobinary signal comprises most significant bit data for the optical PAM-4 signal, and the second optical duobinary signal comprises least significant bit data for the optical PAM-4 signal.

In some embodiments, the system further comprises an optical splitter configured to split the input optical signal into the first portion of the input optical signal provided to the first MZM structure and the second portion of the input optical signal provided to the second MZM structure.

In some embodiments, the bias electrode structure is configured to apply a bias to the second optical duobinary signal to generate a phase-shifted version of the second optical duobinary signal. Furthermore, in some embodiments, the system further comprises an optical combiner configured to combine the first optical duobinary signal and the phase-shifted version of the second optical duobinary signal into the optical PAM-4 signal.

In some embodiments, the bias electrode structure is a first bias electrode structure, and wherein the first semiconductor device is a first electro-absorption modulator and the second semiconductor device is a second electro-absorption modulator associated with a second bias electrode structure.

In some embodiments, the system further comprises an optical splitter configured to split the input optical signal into the first portion of the input optical signal provided to the first MZM structure and the second portion of the input optical signal provided to the second MZM structure. Furthermore, in some embodiments, the bias electrode structure is a first bias electrode structure. Furthermore, in some embodiments, the first semiconductor device is a first electro-absorption modulator and the second semiconductor device is a second electro-absorption modulator associated with a second bias electrode structure.

In some embodiments, the system further comprises a third MZM structure and a fourth MZM structure. In some embodiments, the third MZM structure comprises a fifth waveguide interferometer arm structure associated with a fifth semiconductor device. In some embodiments, the third MZM structure also comprises a sixth waveguide interferometer arm structure associated with a sixth semiconductor device. In some embodiments, the fourth MZM structure comprises a seventh waveguide interferometer arm structure associated with a seventh semiconductor device. In some embodiments, the fourth MZM structure also comprises an eighth waveguide interferometer arm structure associated with an eighth semiconductor device.

In some embodiments, the bias electrode structure is a first bias electrode structure. Furthermore, in some embodiments, the system further comprises a second bias electrode structure configured to adjust phase between a third optical duobinary signal associated with the third MZM structure and a fourth optical duobinary signal associated with the fourth MZM structure.

In some embodiments, the first bias electrode structure is configured to apply a first bias to the second optical duobinary signal to generate a biased version of the second optical duobinary signal. In some embodiments, the second bias electrode structure is configured to apply a second bias to the fourth optical duobinary signal to generate a biased version of the fourth optical duobinary signal. Furthermore, in some embodiments, the system further comprises an optical combiner configured to combine the first optical duobinary signal, the biased version of the second optical duobinary signal, the third optical duobinary signal, and the biased version of the fourth optical duobinary signal into the optical PAM-4 signal.

In some embodiments, the system further comprises a polarization rotator device configured to modify polarization of a combined optical duobinary signal associated with the third optical duobinary signal and the fourth optical duobinary signal.

In some embodiments, the optical PAM-4 signal is an optical polarization switched PAM-4 signal.

In some embodiments, the optical PAM-4 signal is an optical polarization multiplexed PAM-4 signal.

In some embodiments, the system further comprises a first optical splitter configured to split the input optical signal into the first portion of the input optical signal provided to the first MZM structure and the second portion of the input optical signal provided to the second MZM structure. Furthermore, in some embodiments, the system further comprises a second optical splitter configured to split the input optical signal into a third portion of the input optical signal provided to the third MZM structure and a fourth portion of the input optical signal provided to the fourth MZM structure.

BRIEF DESCRIPTION OF THE DRAWINGS

Figure 1:
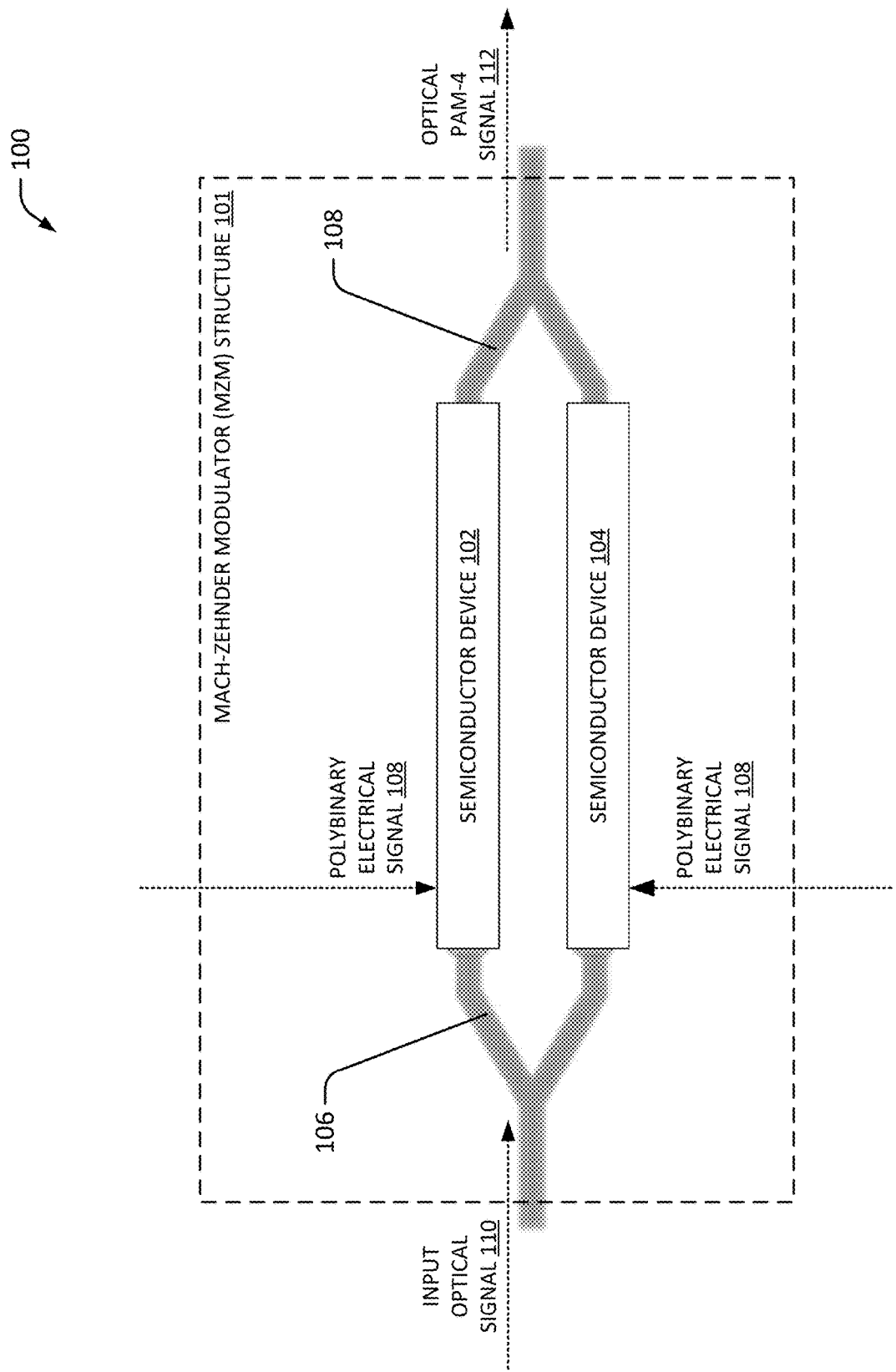
Figure 2:
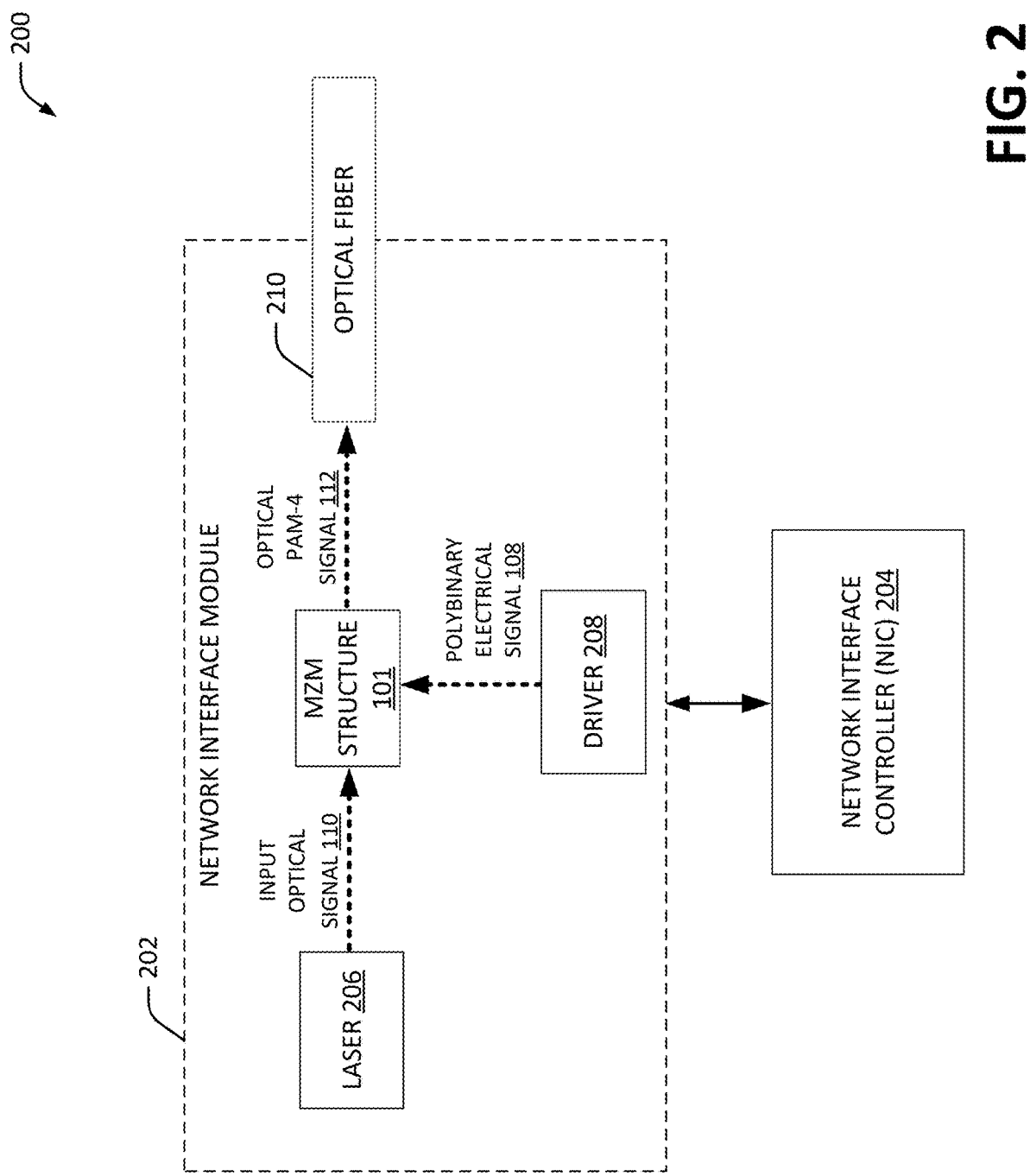
Figure 3:
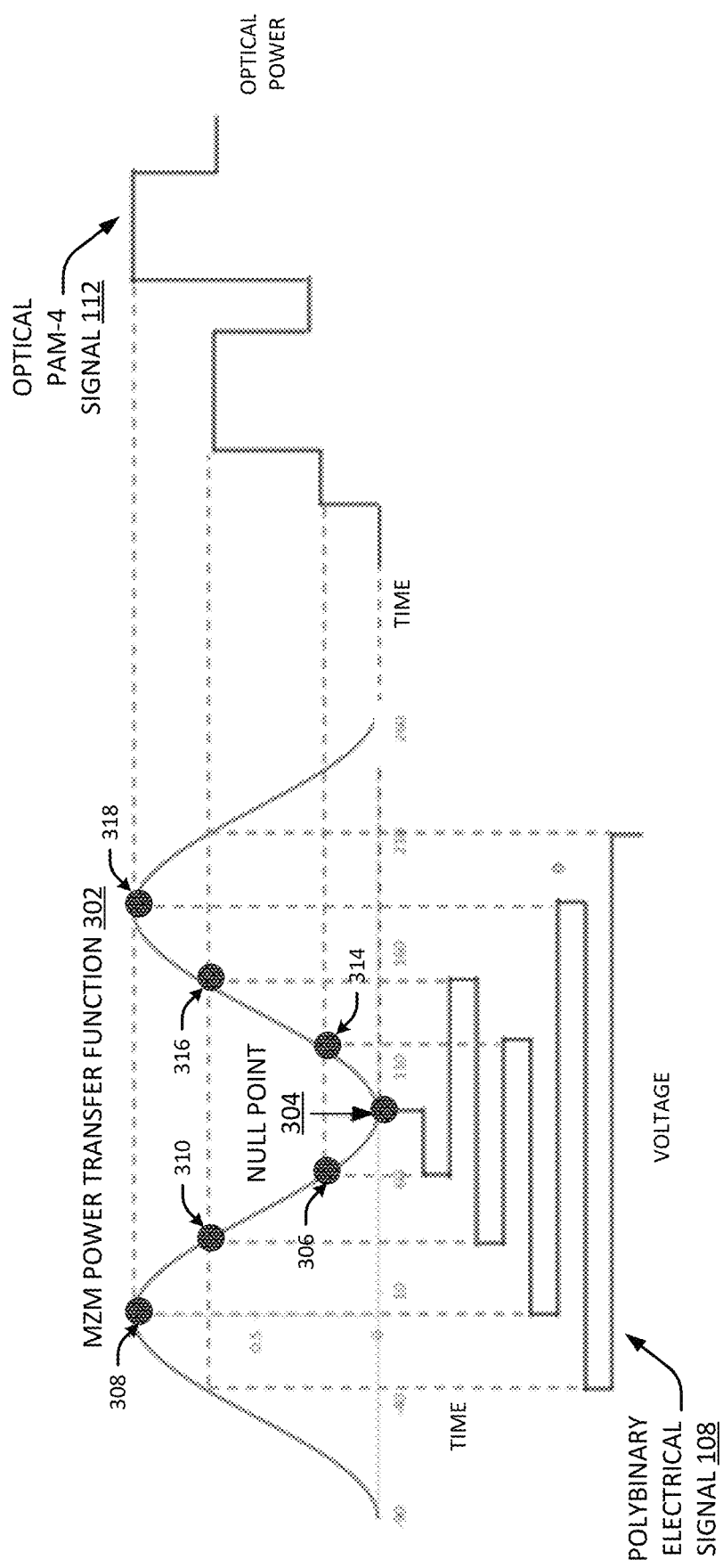
Figure 4:
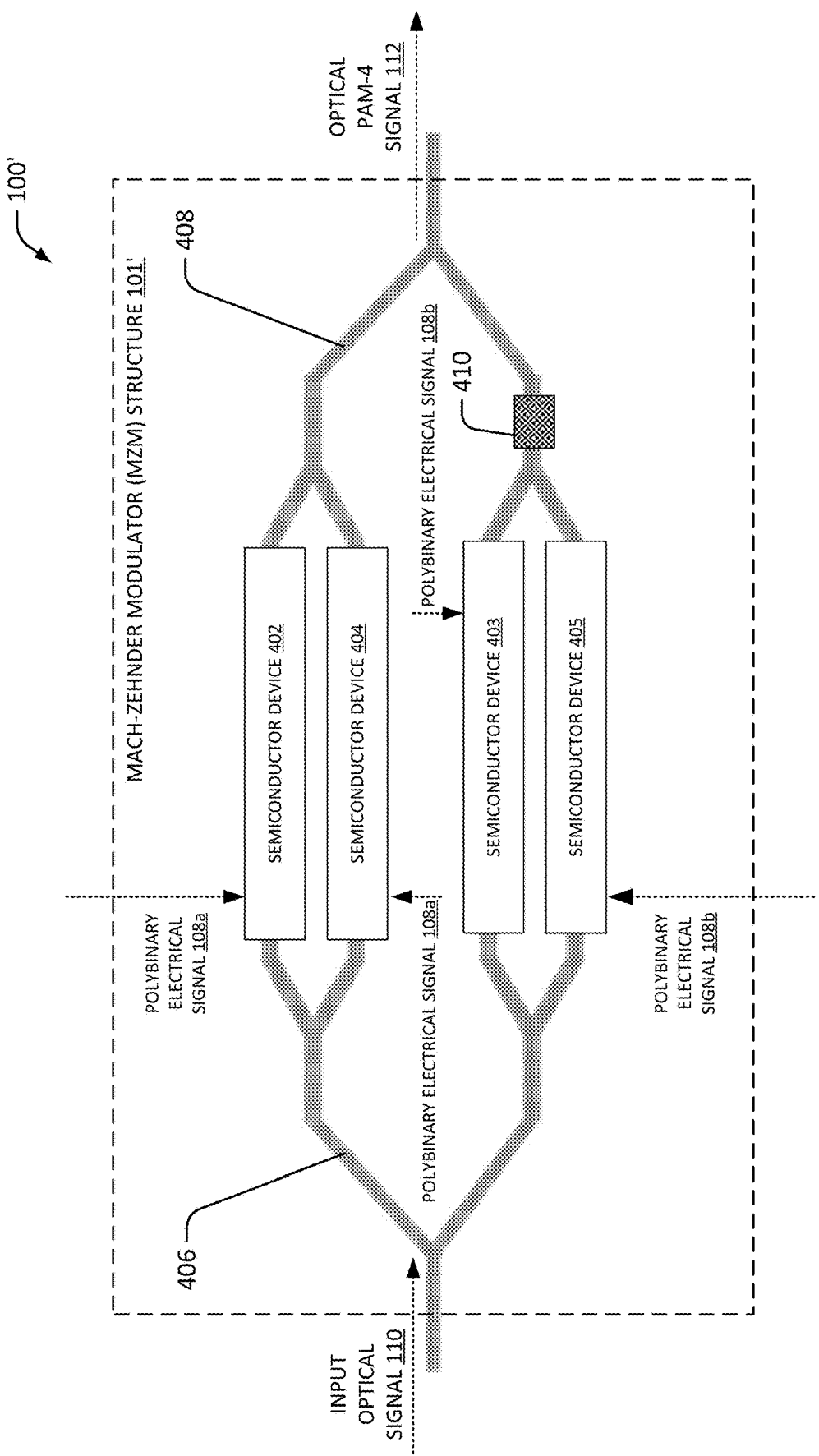
Figure 5:
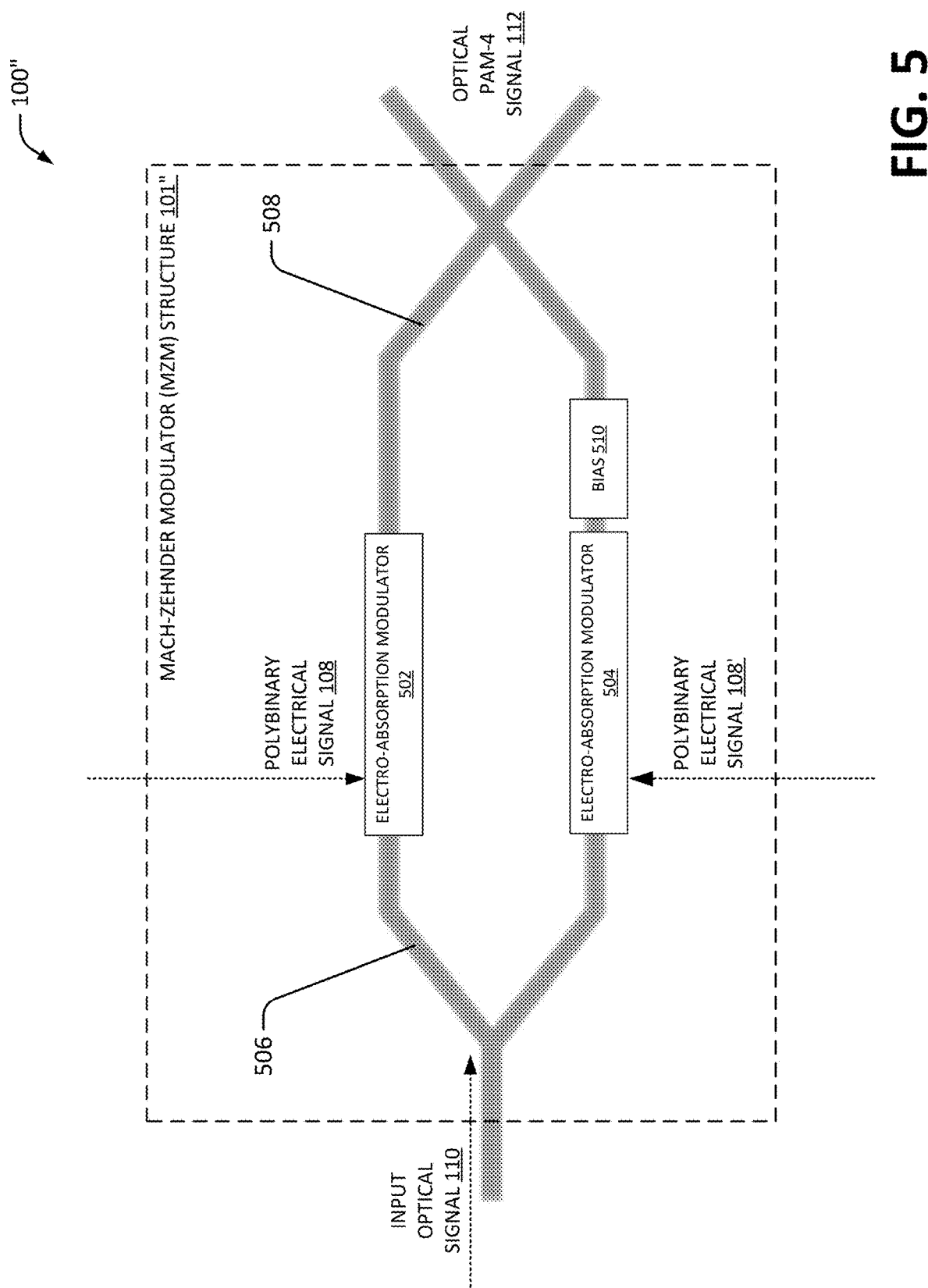
Figure 6:
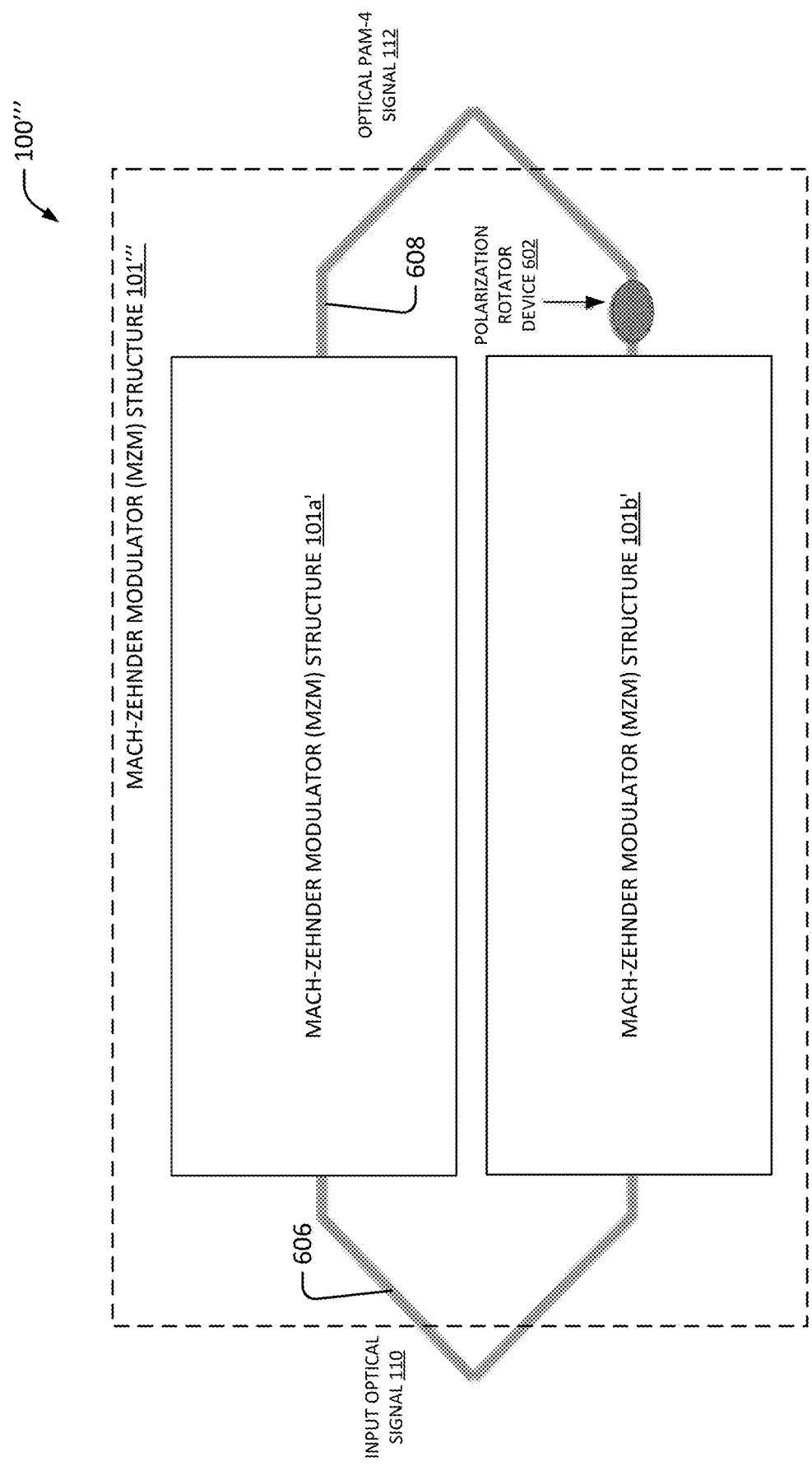
Figure 7:
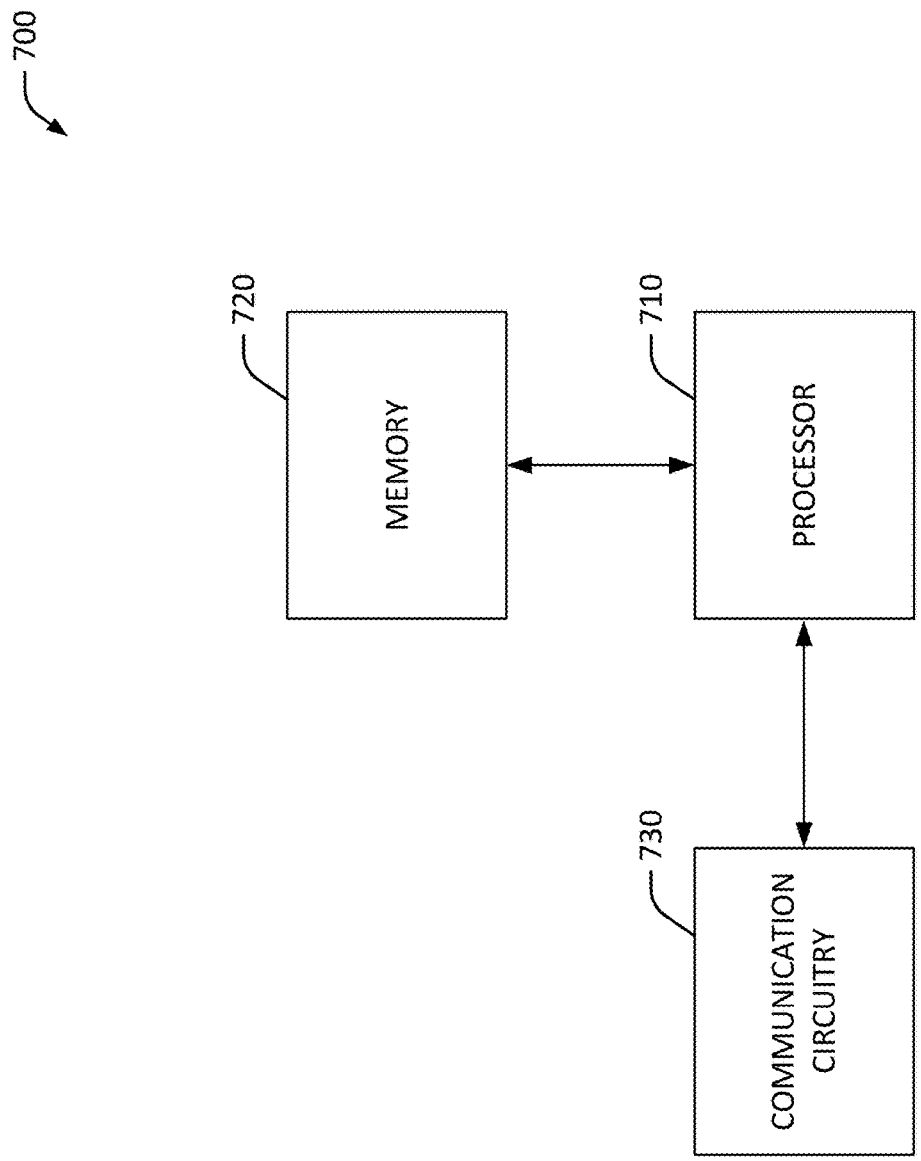

Having thus described the invention in general terms, reference will now be made to the accompanying drawings, which are not necessarily drawn to scale, and wherein:

FIG. 1 illustrates an example optical communication system, in accordance with one or more embodiments of the present disclosure;

FIG. 2 illustrates an example system that includes a network interrace module and a network interface controller, in accordance with one or more embodiments of the present disclosure;

FIG. 3 illustrates generation of an optical PAM-4 signal based on a polybinary electrical signal, in accordance with one or more embodiments of the present disclosure;

FIG. 4 illustrates another example optical communication system, in accordance with one or more embodiments of the present disclosure;

FIG. 5 illustrates another example optical communication system, in accordance with one or more embodiments of the present disclosure;

FIG. 6 illustrates another example optical communication system, in accordance with one or more embodiments of the present disclosure; and FIG. 7 illustrates an example computing system that may be embedded in the communication system, in accordance with one or more embodiments of the present disclosure.

DETAILED DESCRIPTION OF THE INVENTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

Optical communications have fundamentally enabled many advances in networks over the last decades. For example, because information no longer needs to be processed at the place where it has been harvested or generated, information can be transported to dedicated spaces for computation. As a result, cloud computing is enabled and has changed the landscape of the Internet. The transfer of information between data centers or high-performance computing clusters (HPC), or intra-data center or intra-HPC, usually makes use of optical communication systems that require laser sources for generating the light channels. The light conveying the information can be generated through external modulators (e.g., Mach-Zehnder modulators, micro-ring modulators, or externally modulated lasers (EMLs)) or directly by the same device that generates the light (e.g. directly modulated lasers (DMLs), or vertical cavity surface emitting lasers (VCSELs)).

In intra-data center communications, distances are traditionally short (<10 km). Such links pose a unique set of requirements combining low-cost processing per data bit and very high data capacity. In order to cope with bandwidth demand in datacenters, it is generally desirable to double the speed and cut down the cost of such links every few years. In this regard, high-speed photonic component technologies are generally employed for intra-data center communications. For example, single-mode technologies such as an indium-phosphide electro-absorption modulated laser (EML) and/or a silicon photonic Mach-Zehnder modulator can be employed for intra-data center communications. As bandwidth demand in datacenters persists, it is desirable to continue to also scale one or more of these technologies. As such, in certain implementations in order to satisfy bandwidth demand in datacenters, it is desirable to improve modulation components such as Mach-Zehnder modulators which typically offer larger bandwidth values compared to EMLs.

Thus, to address these and/or other issues, generation of an optical Pulse Amplitude Modulation 4-level (PAM-4) signal from bandwidth-limited electrical signals in a Mach-Zehnder modulator is disclosed herein. Such bandwidth limited signals are produced using duobinary/polybinary coding. For instance, in one or more embodiments, duobinary signaling can be combined with a nonlinear transfer function of an electro-optic Mach-Zehnder modulator to generate an optical PAM4 signal. In one or more embodiments, the Mach-Zehnder modulator that generates the optical PAM-4 signal from the bandwidth-limited duobinary electrical signals provides bandwidth efficient modulation that can scale bitrate of transmitted data without having to increase bandwidth of photonic components. In various embodiments, a Mach-Zehnder modulator disclosed herein provides modulation with double the bitrate as compared to conventional short-reach optical communications by transmitting two bits per symbol. In various embodiments disclosed herein, a PAM-4 transmitter with low-bandwidth electro-optic components is provided. As such, improved bandwidth in short-reach optical links can be provided. For instance, scaling to higher transmitted bitrates can be provided without the need for a faster modulator and/or faster driving electronics in a transmitter.

FIG. 1 illustrates a system 100 that facilitates optical communications such as, for example, short-reach optical communications according to one or more embodiments of the present disclosure. In one or more embodiments, the system 100 is configured to generate an optical PAM-4 signal from bandwidth-limited duobinary electrical signals in a Mach-Zehnder modulator. The system 100 includes a Mach-Zehnder modulator (MZM) structure 101. In one or more embodiments, the MZM structure 101 can be a silicon photonic MZM. In one or more embodiments, the MZM structure 101 can be configured as a modulator to convert one or more data streams from an electrical domain to an optical domain. For example, in one or more embodiments, the MZM structure 101 can be configured as a modulator to convert one or more electrical lanes into one or more optical lanes. The MZM structure 101 includes a semiconductor device 102 and a semiconductor device 104. In an aspect, a first side of the semiconductor device 102 and the semiconductor device 104 are coupled via an input waveguide 106. Furthermore, a second side of the semiconductor device 102 and the semiconductor device 104 are coupled via an output waveguide 108.

In one or more embodiments, the input waveguide 106 of the MZM structure 101 is configured to receive an input optical signal 110. The input optical signal 110 can be, for example, an optical signal generated by a laser. The input optical signal 110 can be an unmodulated optical carrier. In an embodiment, the semiconductor device 102, a top portion of the input waveguide 106, and a top portion of the output waveguide 108 can correspond to a first waveguide interferometer arm structure of the MZM structure 101. Furthermore, the semiconductor device 104, a bottom portion of the input waveguide 106, and a bottom portion of the output waveguide 108 can correspond to a second waveguide interferometer arm structure of the MZM structure 101. The input waveguide 106 and/or the output waveguide 108 can be optical waveguides. For example, the input waveguide 106 and/or the output waveguide 108 can include a core and/or a cladding. Light can be transmitted via the core of the input waveguide 106 and/or the output waveguide 108. Furthermore, the cladding of the input waveguide 106 and/or the output waveguide 108 can be a surrounding medium for the core that is not associated with transmission of light. The core of the input waveguide 106 and/or the output waveguide 108 can comprise a higher index of refraction than the cladding, such that, in operation, light is directed by the cladding back toward the core and, light is thereby propagated through the waveguide. In an embodiment, the core of the input waveguide 106 and/or the output waveguide 108 can comprise silicon. Additionally, the cladding of the input waveguide 106 and/or the output waveguide 108 can include silicon dioxide or silicon nitride. However, it is to be appreciated that, in certain embodiments, the core and/or the cladding of the input waveguide 106 and/or the output waveguide 108 can comprise a different type of material such that the core comprises a higher index of refraction than the cladding. In one or more embodiments, the input waveguide 106 and/or the output waveguide 108 can be patterned into a silicon layer of the MZM structure 101. In certain embodiments, the input waveguide 106 comprises an optical splitter configured to split the input optical signal 110 into a first portion of the input optical signal 110 provided to the semiconductor device 102 and the second portion of the input optical signal 110 provided to the semiconductor 104.

In one or more embodiments, the semiconductor device 102 can be configured as a top arm phase shifter of the MZM structure 101 and the semiconductor device 104 can be configured as a bottom arm phase shifter of the MZM structure 101. In one or more embodiments, the semiconductor device 102 can comprise first semiconductor material associated with a first doped region of the MZM structure 101 and the semiconductor device 104 can comprise second semiconductor material associated with a second doped region of the MZM structure 101. For example, in one or more embodiments, the first semiconductor material of the semiconductor device 102 can comprise silicon (e.g., doped silicon), silicon dioxide, silicide and/or a metal. Furthermore, in one or more embodiments, the second semiconductor material of the semiconductor device 104 can comprise silicon (e.g., doped silicon), silicon dioxide, silicide and/or a metal. In certain embodiments, the semiconductor device 102 can comprise a first set of electrodes and the semiconductor device 104 can comprise a second set of electrodes.

In one or more embodiments, a polybinary electrical signal 108 can be applied to the semiconductor device 102 and/or the semiconductor device 104. The polybinary electrical signal 108 can be configured to bias the MZM structure 101 at a null point (e.g., a null operating point) of the MZM structure 101. For example, in one or more embodiments, the polybinary electrical signal 108 can be configured to bias the MZM structure 101 at a null point (e.g., a null operating point) of the semiconductor device 102 and/or the semiconductor device 104. In one or more embodiments, the polybinary electrical signal 108 can be a 7-level electrical signal configured based on a power transfer function of the MZM structure 101. For example, the polybinary electrical signal 108 can include 7 amplitude levels. In one or more embodiments, a correlation span of the polybinary electrical signal 108 can be 7 levels represented by 7 levels that includes three positive voltage levels with respect to a zero voltage level, three negative voltage levels with respect to the zero voltage level, and a null point level at the zero voltage level. In one or more embodiments, the polybinary electrical signal 108 can be applied to the semiconductor device 102 and/or the second semiconductor device 104 to convert the input optical signal 110 provided to the MZM structure 101 into an optical PAM-4 signal 112. The optical PAM-4 signal 112 can be an optical pulse amplitude modulation signal that encodes information via pulse amplitude modulation associated with four levels. For example, the optical PAM-4 signal 112 can be an optical pulse amplitude modulation signal that encodes information in the form of amplitude levels that represent 0, 1, 2, and 3. In certain embodiments, the output waveguide 108 comprises an optical combiner configured to combine a first optical duobinary signal provided by the semiconductor device 102 and a second optical duobinary signal provided by the semiconductor device 104 into the optical PAM-4 signal 112.

FIG. 2 illustrates a system 200 that facilitates optical communications such as, for example, short-reach optical communications according to one or more embodiments of the present disclosure. The system 200 includes a network interface module 202 and/or a network interface controller (NIC) 204. The network interface module 202 can include the MZM structure 101, a laser 206, and/or a driver 208. Furthermore, in one or more embodiments, the network interface module 202 can include and/or can be configured to couple to an optical fiber 210. The network interface module 202 can be, for example, a transceiver device (e.g., an optical transceiver) that facilitates fiber optic communication. In one or more embodiments, the network interface module 202 can be a pluggable optical transceiver with a set of pins to facilitate connection with the optical fiber 210. The optical fiber 210 can be, for example, a fiber optic communication channel (e.g., a transparent fiber optic connection, a fiber optic wire, etc.) that transmits pulses of infrared light.

In an embodiment, the optical fiber 210 includes a single optical communication channel (e.g., a single fiber optic wire). In another embodiment, the optical fiber 210 includes two or more optical communication channels (e.g., two or more fiber optic wires). In another embodiment, the optical fiber 210 can include, additionally or alternatively, a fiber bundle. However, it is to be appreciated that, in certain embodiments, the optical fiber 210 can be implemented in a different manner to facilitate fiber optic communications via the optical fiber 210. In certain embodiments, the optical fiber 210 can be a single mode optical fiber cable. Alternatively, in certain embodiments, the optical fiber 210 can be a multimode optical fiber cable. However, it is to be appreciated that, in certain embodiments, the optical fiber 210 can be implemented as a different type of optical fiber.

The laser 206 can be, for example, an optical transceiver laser. In one or more embodiments, the laser 206 can be configured to emit the input optical signal 110. The input optical signal 110 can be, for example, an optical signal associated with data for transmission via the optical fiber 210. For example, in one or more embodiments, the input optical signal 110 can be an unmodulated optical carrier. In one or more embodiments, the laser 206 can emit the input optical signal 110 at a particular wavelength. In an embodiment, the laser 206, the driver 208, and/or the MZM structure 101 can be attached to a substrate such as, for example, a printed circuit board of the network interface module 202.

In certain embodiments, the laser 206 can be configured as an directly modulated laser (DML). In certain embodiments, the laser 206 can be configured as a vertically coupled laser. Alternatively, in certain embodiments, the laser 206 can be configured as a horizontally coupled laser. In an embodiment, the laser 206 is a semiconductor laser diode that emits the input optical signal 110 vertically with respect to a top surface of the laser 206. For example, in certain embodiments, the laser 206 can be a vertical cavity surface emitting laser (VCSEL). In another embodiment, the laser 206 is a semiconductor laser diode that emits the input optical signal 110 horizontally with respect to a top surface of the laser 206.

In an embodiment, the NIC 204 can be coupled (e.g., physically coupled and/or communicatively coupled) to the network interface module 202. In another embodiment, the network interface module 202 can include the NIC 204. In an embodiment, the NIC 204 can be configured to manage generation of the input optical signal 110 via the laser 206. For example, in an embodiment, the NIC 204 can be configured to control emission of the input optical signal 110 via the laser 206. In certain embodiments, the NIC 204 can be configured to manage timing of transmission of the input optical signal 110. In another embodiment, the NIC 204 can be configured to select the input optical signal 110 for transmission. In one or more embodiments, the NIC 204 can be configured to manage one or more inputs provided to the laser 206 and/or one or more settings for the laser 206 to facilitate emission of the input optical signal 110 via the laser 206.

Additionally or alternatively, in an embodiment, the NIC 204 can be configured to manage generation of the polybinary electrical signal 108 via the driver 208. In certain embodiments, the NIC 204 can be configured as a bias controller for the network interface module 202. For example, in certain embodiments, the NIC 204 can be configured as a bias controller to control a degree of bias provided by the polybinary electrical signal 108. In one or more embodiments, the NIC 204 can be configured to manage one or more inputs provided to the driver 208 and/or one or more settings for the driver 208 to facilitate generation of the polybinary electrical signal 108 via the driver 208. In one or more embodiment, the NIC 204 can configure the polybinary electrical signal 108 to bias the MZM structure 101 at a null point (e.g., a null operating point) of the MZM structure 101. For example, in one or more embodiments, the NIC 204 can configure the polybinary electrical signal 108 to bias the MZM structure 101 at a null point (e.g., a null operating point) of the semiconductor device 102 and/or the semiconductor device 104. In one or more embodiments, the NIC 204 can configure the polybinary electrical signal 108 as a 7-level electrical signal configured based on a power transfer function of the MZM structure 101. For example, the NIC 204 can configure the polybinary electrical signal 108 with 7 amplitude levels associated with three positive voltage levels with respect to a zero voltage level, three negative voltage levels with respect to the zero voltage level, and a null point level at the zero voltage level.

In one or more embodiments, control from the NIC 204 to the network interface module 202 can be realized based on an electrical lane control signal and/or by sending one or more different data streams to the laser 206 and/or the driver 208. In one or more embodiments, the NIC 204 can transmit one or more control signal (e.g., one or more electrical control signals) to the laser 206 to facilitate emission of the input optical signal 110. In one or more embodiments, the NIC 204 can additionally or alternatively configure the laser 206 with certain data to facilitate emission of the input optical signal 110. Additionally or alternatively, in one or more embodiments, the NIC 204 can transmit one or more control signal (e.g., one or more electrical control signals) to the driver 208 to facilitate generation of the polybinary electrical signal 108.

FIG. 3 illustrates generation of the optical PAM-4 signal 112 based on the polybinary electrical signal 108, according to one or more embodiments of the present disclosure. In one or more embodiments, an MZM power transfer function 302 of the MZM structure 101 can be represented by a cosine signal with a null point 304 associated with zero power. For example, the null point 304 can be a null bias point (e.g., a null operating point) for the MZM structure 101. In one or more embodiments, the polybinary electrical signal 108 can be an electrical driving signal for the MZM structure 101. In one or more embodiment, the polybinary electrical signal 108 can be configured to bias the MZM structure 101 at the null point 304 of the MZM power transfer function 302 associated with the MZM structure 101. For example, the polybinary electrical signal 108 can be configured as a 7-level electrical signal associated with characteristics of the MZM power transfer function 302.

In one or more embodiments, the polybinary electrical signal 108 can include a first level associated with a first negative voltage level that corresponds to a first point lower than the quadrature point 306 of the MZM power transfer function 302, a second level associated with a second negative voltage level that corresponds to a first peak point 308 of the MZM power transfer function 302, a third level associated with a third negative voltage level that corresponds to a first point higher than the quadrature point 310 of the MZM power transfer function 302, a fourth level associated with a zero voltage level that corresponds to the null point 304 of the MZM transfer function 302, a fifth level associated with a first positive voltage level that corresponds to a second point lower than the quadrature point 314 of the MZM power transfer function 302, a sixth level associated with a second positive voltage level that corresponds to a second point higher than the quadrature point 316 of the MZM power transfer function 302, and a seventh level associated with a third positive voltage level that corresponds to a second peak point 318 of the MZM power transfer function 302.

In one or more embodiments, a first level of the optical PAM-4 signal 112 can correspond to a first optical power level associated with the null point 304, a second level of the optical PAM-4 signal 112 can correspond to a second optical power level associated with the point lower than the quadrature 306 (and/or the quadrature point 314), a third level of the optical PAM-4 signal 112 can correspond to a third optical power level associated with the point higher than the quadrature 310 (and/or the quadrature point 316,), and a fourth level of the optical PAM-4 signal 112 can correspond to a third optical power level associated with the peak point 308 (and/or the peak point 318).

In certain embodiments, the polybinary electrical signal 108 can be a multi-level partial response signal provided to the MZM structure 101 where the polybinary electrical signal 108 is generated by adding duobinary most significant bits and least significant bits. In certain embodiments, the polybinary electrical signal 108 can be provided to the MZM structure 101 via separate most significant bit and least significant bit duobinary tributaries. For example, in certain embodiments, the MZM structure 101 can be a segmented MZM and/or a dual-drive MZM that comprises different electrodes where respective most significant bit and least significant bit duobinary tributaries are applied to respective electrodes of the MZM structure 101.

FIG. 4 illustrates a system 100' that facilitates optical communications such as, for example, short-reach optical communications according to one or more embodiments of the present disclosure. The system 100' can be an alternate embodiment of the system 100. The system 100' includes a MZM structure 100'. The MZM structure 100' can be an alternate embodiment of the MZM structure 100. For example, the MZM structure 101' can be a silicon photonic MZM that converts the input optical signal 110 into the optical PAM-4 signal 112. The MZM structure 101' includes a semiconductor device 402, a semiconductor device 403, a semiconductor device 404, and/or a semiconductor device 405. For example, the MZM structure 101' can include a first MZM comprising the semiconductor device 402 and the semiconductor device 404. Furthermore, the MZM structure 101' can include a second MZM comprising the semiconductor device 403 and the semiconductor device 405. In an aspect, a first side of the semiconductor device 402, the semiconductor device 403, the semiconductor device 404, and/or the semiconductor device 405 are coupled via an input waveguide 406. Furthermore, a second side of the semiconductor device 402, the semiconductor device 403, the semiconductor device 404, and/or the semiconductor device 405 are coupled via an output waveguide 408. In certain embodiments, the input waveguide 106 comprises an optical splitter configured to split the input optical signal 110 into a first portion of the input optical signal 110 provided to the first MZM structure and the second portion of the input optical signal 110 provided to the second MZM structure.

In one or more embodiments, the input waveguide 406 of the MZM structure 101' is configured to receive the input optical signal 110. In an embodiment, the semiconductor device 402, a top portion of the input waveguide 406, and a top portion of the output waveguide 408 can correspond to a first waveguide interferometer arm structure of the MZM structure 101'. Furthermore, the semiconductor device 404, another top portion of the input waveguide 406, and another top portion of the output waveguide 408 can correspond to a second waveguide interferometer arm structure of the MZM structure 101'. Furthermore, the semiconductor device 403, a bottom portion of the input waveguide 406, and a bottom portion of the output waveguide 408 can correspond to a third waveguide interferometer arm structure of the MZM structure 101'. Furthermore, the semiconductor device 405, another bottom portion of the input waveguide 406, and another bottom portion of the output waveguide 408 can correspond to a fourth waveguide interferometer arm structure of the MZM structure 101'.

The input waveguide 406 and/or the output waveguide 408 can be optical waveguides. For example, the input waveguide 406 and/or the output waveguide 408 can include a core and/or a cladding. Light can be transmitted via the core of the input waveguide 406 and/or the output waveguide 408. Furthermore, the cladding of the input waveguide 406 and/or the output waveguide 408 can be a surrounding medium for the core that is not associated with transmission of light. The core of the input waveguide 406 and/or the output waveguide 408 can comprise a higher index of refraction than the cladding, such that, in operation, light is directed by the cladding back toward the core and, light is thereby propagated through the waveguide. In an embodiment, the core of the input waveguide 406 and/or the output waveguide 408 can comprise silicon. Additionally, the cladding of the input waveguide 406 and/or the output waveguide 408 can include silicon dioxide or silicon nitride. However, it is to be appreciated that, in certain embodiments, the core and/or the cladding of the input waveguide 406 and/or the output waveguide 408 can comprise a different type of material such that the core comprises a higher index of refraction than the cladding. In one or more embodiments, the input waveguide 406 and/or the output waveguide 408 can be patterned into a silicon layer of the MZM structure 101'.

In one or more embodiments, the semiconductor device 402 can be configured as a top arm phase shifter of the MZM structure 101' and the semiconductor device 404 can be configured as a bottom arm phase shifter of the MZM structure 101'. In one or more embodiments, the semiconductor device 402 can comprise first semiconductor material associated with a first doped region of the MZM structure 101' and the semiconductor device 404 can comprise second semiconductor material associated with a second doped region of the MZM structure 101'. For example, in one or more embodiments, the first semiconductor material of the semiconductor device 402 can comprise silicon (e.g., doped silicon), silicon dioxide, silicide and/or a metal. Furthermore, in one or more embodiments, the second semiconductor material of the semiconductor device 404 can comprise silicon (e.g., doped silicon), silicon dioxide, silicide and/or a metal. In certain embodiments, the semiconductor device 402 can comprise a first set of electrodes and the semiconductor device 404 can comprise a second set of electrodes.

In one or more embodiments, the semiconductor device 403 can be configured as another top arm phase shifter of the MZM structure 101' and the semiconductor device 405 can be configured as another bottom arm phase shifter of the MZM structure 101'. In one or more embodiments, the semiconductor device 403 can comprise third semiconductor material associated with a third doped region of the MZM structure 101' and the semiconductor device 405 can comprise fourth semiconductor material associated with a fourth doped region of the MZM structure 101'. For example, in one or more embodiments, the third semiconductor material of the semiconductor device 403 can comprise silicon (e.g., doped silicon), silicon dioxide, silicide and/or a metal. Furthermore, in one or more embodiments, the fourth semiconductor material of the semiconductor device 405 can comprise silicon (e.g., doped silicon), silicon dioxide, silicide and/or a metal. In certain embodiments, the semiconductor device 403 can comprise a third set of electrodes and the semiconductor device 405 can comprise a fourth set of electrodes.

In one or more embodiments, a polybinary electrical signal 108a can be applied to the semiconductor device 402 and/or the semiconductor device 404. The polybinary electrical signal 108a can be, for example, a first optical duobinary signal that comprises most significant bit data for the optical PAM-4 signal 112. Furthermore, the polybinary electrical signal 108a can be configured to bias the MZM structure 101' at a null point (e.g., a null operating point) of the MZM structure 101'. For example, in one or more embodiments, the polybinary electrical signal 108a can be configured to bias the MZM structure 101' at a null point (e.g., a null operating point) of the semiconductor device 402 and/or the semiconductor device 404. In one or more embodiments, the polybinary electrical signal 108a can be a 3-level electrical signal associated with most significant bits configured based on a power transfer function of the MZM structure 101'. For example, the polybinary electrical signal 108a can include 3 amplitude levels associated with most significant bits. In one or more embodiments, a correlation span of the polybinary electrical signal 108a can be 3 levels represented by 3 levels that includes one positive voltage level with respect to a zero voltage level, one negative voltage level with respect to the zero voltage level, and a null point level at the zero voltage level. In one or more embodiments, the polybinary electrical signal 108a can be applied to the semiconductor device 402 and/or the semiconductor device 404 to facilitate converting the input optical signal 110 provided to the MZM structure 101' into the most significant bit of the optical PAM-4 signal 112.

In one or more embodiments, a polybinary electrical signal 108b can be applied to the semiconductor device 403 and/or the semiconductor device 405. The polybinary electrical signal 108b can be, for example, a second optical duobinary signal that comprises least significant bit data for the optical PAM-4 signal 112. Furthermore, the polybinary electrical signal 108b can be configured to bias the MZM structure 101' at a null point (e.g., a null operating point) of the MZM structure 101'. For example, in one or more embodiments, the polybinary electrical signal 108b can be configured to bias the MZM structure 101' at a null point (e.g., a null operating point) of the semiconductor device 403 and/or the semiconductor device 405. In one or more embodiments, the polybinary electrical signal 108b can be a 3-level electrical signal associated with least significant bits configured based on a power transfer function of the MZM structure 101'. For example, the polybinary electrical signal 108b can include 3 amplitude levels associated with least significant bits. In one or more embodiments, a correlation span of the polybinary electrical signal 108b can be 3 levels represented by 3 levels that includes one positive voltage level with respect to a zero voltage level, one negative voltage level with respect to the zero voltage level, and a null point level at the zero voltage level. In one or more embodiments, the polybinary electrical signal 108b can be applied to the semiconductor device 403 and/or the semiconductor device 405 to facilitate converting the input optical signal 110 provided to the MZM structure 101' into the least significant bit of the optical PAM-4 signal 112.

As such, the polybinary electrical signal 108a can drive the first MZM (e.g., a first child MZM structure) of the MZM structure 101' comprising the semiconductor device 402 and the semiconductor device 404. Additionally, the polybinary electrical signal 108b can drive the second MZM (e.g., a second child MZM structure) of the MZM structure 101' comprising the semiconductor device 403 and the semiconductor device 405. In certain embodiments, the MZM structure 101' includes a phase electrode 410. The phase electrode 410 can be configured to adjust relative phase between the first MZM (e.g., the first child MZM structure) of the MZM structure 101' and the second MZM (e.g., the second child MZM structure) of the MZM structure 101'. For example, at an output of the first MZM (e.g., the first child MZM structure), a first optical duobinary signal (e.g., a two-level signal) can be generated. The relative phase of different pulses in the first optical duobinary signal can be 0 or 7l Furthermore, at an output of the second MZM (e.g., the second child MZM structure), a second optical duobinary signal (e.g., another two-level signal) can be generated. The relative phase of different pulses in the second optical duobinary signal can also be 0 or 7l As such, the phase electrode 410 can be configured to adjust intensity of the first optical duobinary signal to be twice the intensity of the second optical duobinary signal. In certain embodiments, the phase electrode 410 can be configured to adjust intensity of the first optical duobinary signal to be twice the intensity of the second optical duobinary signal. In certain embodiments, the output waveguide 108 comprises an optical combiner configured to combine a first optical duobinary signal provided by the first MZM and a second optical duobinary signal provided by the second MZM into the optical PAM-4 signal 112.

FIG. 5 illustrates a system 100" that facilitates optical communications such as, for example, short-reach optical communications according to one or more embodiments of the present disclosure. The system 100" can be an alternate embodiment of the system 100. The system 100" includes a MZM structure 100". The MZM structure 100" can be an alternate embodiment of the MZM structure 100. For example, the MZM structure 101" can be a silicon photonic MZM with electro-absorption modulators that convert the input optical signal 110 into the optical PAM-4 signal 112. The MZM structure 101" includes an electro-absorption modulator 502 and an electro-absorption modulator 504. In an aspect, a first side of the electro-absorption modulator 502 and the electro-absorption modulator 504 are coupled via an input waveguide 506. Furthermore, a second side of the electro-absorption modulator 502 and the electro-absorption modulator 504 are coupled via an output waveguide 508.

In one or more embodiments, the input waveguide 506 of the MZM structure 101" is configured to receive the input optical signal 110. In an embodiment, the electro-absorption modulator 502, a top portion of the input waveguide 506, and a top portion of the output waveguide 508 can correspond to a first waveguide interferometer arm structure of the MZM structure 101". Furthermore, the electro-absorption modulator 504, a bottom portion of the input waveguide 506, and bottom portion of the output waveguide 508 can correspond to a second waveguide interferometer arm structure of the MZM structure 101".

The input waveguide 506 and/or the output waveguide 508 can be optical waveguides. For example, the input waveguide 506 and/or the output waveguide 508 can include a core and/or a cladding. Light can be transmitted via the core of the input waveguide 506 and/or the output waveguide 508. Furthermore, the cladding of the input waveguide 506 and/or the output waveguide 508 can be a surrounding medium for the core that is not associated with transmission of light. The core of the input waveguide 506 and/or the output waveguide 508 can comprise a higher index of refraction than the cladding, such that, in operation, light is directed by the cladding back toward the core and, light is thereby propagated through the waveguide. In an embodiment, the core of the input waveguide 506 and/or the output waveguide 508 can comprise silicon. Additionally, the cladding of the input waveguide 506 and/or the output waveguide 508 can include silicon dioxide or silicon nitride. However, it is to be appreciated that, in certain embodiments, the core and/or the cladding of the input waveguide 506 and/or the output waveguide 508 can comprise a different type of material such that the core comprises a higher index of refraction than the cladding. In one or more embodiments, the input waveguide 506 and/or the output waveguide 508 can be patterned into a silicon layer of the MZM structure 101".

In one or more embodiments, the electro-absorption modulator 502 can be configured as a top arm phase shifter of the MZM structure 101" and the electro-absorption modulator 504 can be configured as a bottom arm phase shifter of the MZM structure 101". In one or more embodiments, the polybinary electrical signal 108 can be applied to the electro-absorption modulator 502. The polybinary electrical signal 108a can be configured to bias the MZM structure 101" at a null point (e.g., a null operating point) of the MZM structure 101". For example, in one or more embodiments, the polybinary electrical signal 108 can be configured to bias the MZM structure 101" at a null point (e.g., a null operating point) of the electro-absorption modulator 502. In one or more embodiments, the polybinary electrical signal 108 can be a 7-level electrical signal configured based on a power transfer function of the MZM structure 101". For example, the polybinary electrical signal 108 can include 7 amplitude levels. In one or more embodiments, a correlation span of the polybinary electrical signal 108 can be 7 levels represented by 7 levels that includes four positive voltage levels with respect to a zero voltage level, four negative voltage levels with respect to the zero voltage level, and a null point level at the zero voltage level. In one or more embodiments, the polybinary electrical signal 108 can be applied to the electro-absorption modulator 502 to facilitate converting the input optical signal 110 provided to the MZM structure 101" into the optical PAM-4 signal 112.

Additionally, in one or more embodiments, a polybinary electrical signal 108' can be applied to the electro-absorption modulator 504. The polybinary electrical signal 108' can be a complementary version of the polybinary electrical signal 108. In one or more embodiments, the polybinary electrical signal 108' can be a 9-level electrical signal configured based on a power transfer function of the electro-absorption modulator 502 and the electro-absorption modulator 504. For example, the polybinary electrical signal 108' can include 7 amplitude levels. In one or more embodiments, a correlation span of the polybinary electrical signal 108 can be 7 levels represented by 7 levels that includes three positive voltage levels with respect to a zero voltage level, three negative voltage levels with respect to the zero voltage level, and a null point level at the zero voltage level. In one or more embodiments, the polybinary electrical signal 108' can be applied to the electro-absorption modulator 502 to facilitate converting the input optical signal 110 provided to the MZM structure 101" into the optical PAM-4 signal 112.

In certain embodiments, the MZM structure 101" can include a bias 510. The bias 510 can be a bias electrode structure configured to adjust phase between a first optical duobinary signal associated with the electro-absorption modulator 502 and the second optical duobinary signal associated with the electro-absorption modulator 504 to facilitate generation of an optical PAM-4 signal 112.

FIG. 6 illustrates a system 100' that facilitates optical communications such as, for example, short-reach optical communications according to one or more embodiments of the present disclosure. The system 100' can be an alternate embodiment of the system 100 and/or the system 101'. The system 100' includes a MZM structure 101'''. The MZM structure 101''' can be an alternate embodiment of the MZM structure 100 and/or the MZM structure 101'. For example, the MZM structure 101''' can be a silicon photonic MZM that converts the input optical signal 110 into the optical PAM-4 signal 112. The MZM structure 101''' can include two or more of the MZM structure 101'. For example, the MZM structure 101''' can include a MZM structure 101a' that corresponds to the MZM structure 101' and a MZM structure 101b' that corresponds to the MZM structure 101'.

The MZM structure 101a' includes the semiconductor device 402, the semiconductor device 403, the semiconductor device 404, and/or the semiconductor device 405 configured as shown in FIG. 4. Additionally, the MZM structure 101a' includes the semiconductor device 402, the semiconductor device 403, the semiconductor device 404, and/or the semiconductor device 405 configured as shown in FIG. 4. In an aspect, a first side of the MZM structure 101a' and the MZM structure 101b' are coupled via an input waveguide 606. Furthermore, a second side of the first side of the MZM structure 101a' and the MZM structure 101b' are coupled via an output waveguide 608.

In one or more embodiments, the input waveguide 606 of the MZM structure 101' is configured to receive the input optical signal 110. In an embodiment, the semiconductor device 402 of the MZM structure 101a', a top portion of the input waveguide 606, and a top portion of the output waveguide 608 can correspond to a first waveguide interferometer arm structure of the MZM structure 101'''. Furthermore, the semiconductor device 404 of the MZM structure 101a', another top portion of the input waveguide 606, and another top portion of the output waveguide 608 can correspond to a second waveguide interferometer arm structure of the MZM structure 101'''. Furthermore, the semiconductor device 403 of the MZM structure 101a', another top portion of the input waveguide 606, and another top portion of the output waveguide 608 can correspond to a third waveguide interferometer arm structure of the MZM structure 101'. Furthermore, the semiconductor device 405 of the MZM structure 101a', another top portion of the input waveguide 606, and another top portion of the output waveguide 608 can correspond to a fourth waveguide interferometer arm structure of the MZM structure 101'''. In certain embodiments, the input waveguide 106 comprises an optical splitter configured to split the input optical signal 110 into a first portion of the input optical signal 110 provided to the MZM structure 101a' and the second portion of the input optical signal 110 provided to the MZM structure 101b'.

Additionally, in an embodiment, the semiconductor device 402 of the MZM structure 101b', a bottom portion of the input waveguide 606, and a bottom portion of the output waveguide 608 can correspond to a fifth waveguide interferometer arm structure of the MZM structure 101'''. Furthermore, the semiconductor device 404 of the MZM structure 101b', another bottom portion of the input waveguide 606, and another bottom portion of the output waveguide 608 can correspond to a sixth waveguide interferometer arm structure of the MZM structure 101'''. Furthermore, the semiconductor device 403 of the MZM structure 101b', another bottom portion of the input waveguide 606, and another bottom portion of the output waveguide 608 can correspond to a seventh waveguide interferometer arm structure of the MZM structure 101'. Furthermore, the semiconductor device 405 of the MZM structure 101b', another bottom portion of the input waveguide 606, and another bottom portion of the output waveguide 608 can correspond to an eighth waveguide interferometer arm structure of the MZM structure 101'''.

The input waveguide 606 and/or the output waveguide 608 can be optical waveguides. For example, the input waveguide 606 and/or the output waveguide 608 can include a core and/or a cladding. Light can be transmitted via the core of the input waveguide 606 and/or the output waveguide 608. Furthermore, the cladding of the input waveguide 606 and/or the output waveguide 608 can be a surrounding medium for the core that is not associated with transmission of light. The core of the input waveguide 606 and/or the output waveguide 608 can comprise a higher index of refraction than the cladding, such that, in operation, light is directed by the cladding back toward the core and, light is thereby propagated through the waveguide. In an embodiment, the core of the input waveguide 606 and/or the output waveguide 608 can comprise silicon. Additionally, the cladding of the input waveguide 606 and/or the output waveguide 608 can include silicon dioxide or silicon nitride. However, it is to be appreciated that, in certain embodiments, the core and/or the cladding of the input waveguide 606 and/or the output waveguide 608 can comprise a different type of material such that the core comprises a higher index of refraction than the cladding. In one or more embodiments, the input waveguide 606 and/or the output waveguide 408 can be patterned into a silicon layer of the MZM structure 101'''.

In certain embodiments, the MZM structure 101''' includes a polarization rotator device 602 configured to modify polarization of a combined optical duobinary signal associated with an optical duobinary signal provided by the MZM structure 101a' and another optical duobinary signal provided by the MZM structure 101b'. As such, in certain embodiments, the MZM structure 101''' can be configured as a dual-polarization modulator. Furthermore, in certain embodiments, the optical PAM-4 signal can be configured as an optical polarization switched PAM-4 signal. In certain embodiments, the output waveguide 608 comprises an optical combiner configured to combine a first optical duobinary signal provided by the MZM structure 101a' and a second optical duobinary signal provided by the MZM structure 101b' into the optical PAM-4 signal 112.

In certain embodiments, instead of the polarization rotator device 602, the MZM structure 101''' includes a multiplexer device configured for multiplexing a combined optical duobinary signal associated with an optical duobinary signal provided by the MZM structure 101a' and another optical duobinary signal provided by the MZM structure 101b'. As such, in certain embodiments, the MZM structure 101''' can be configured as a polarization multiplexed modulator. Furthermore, in certain embodiments, the optical PAM-4 signal can be configured as an optical multiplexed PAM-4 signal.

FIG. 7 illustrates a computing system 700 that may be embedded in a datacenter network system. In some cases, the computing system 700 may be a firmware computing system communicatively coupled with, and configured to control, one or more circuit modules associated with a network interface module (e.g., a transceiver module). For example, the computing system 700 may be a firmware computing system and/or a controller computing system communicatively coupled with one or more circuit modules, such as a network interface module (e.g., the network interface module 202), a laser (e.g., the laser 206), a driver (e.g., the driver 208), and/or a NIC (e.g., the NIC 204). The computing system 700 may include or otherwise be in communication with a processor 710, a memory circuitry 720, and communication circuitry 730. In some embodiments, the processor 710 (which may include multiple or co-processors or any other processing circuitry associated with the processor) may be in communication with the memory circuitry 720. The memory circuitry 720 may comprise non-transitory memory circuitry and may include one or more volatile and/or non-volatile memories. In some examples, the memory circuitry 720 may be an electronic storage device (e.g., a computer readable storage medium) configured to store data that may be retrievable by the processor 710. In some examples, the data stored in the memory 720 may include communication protocol data, or the like for enabling the apparatus to carry out various functions or methods in accordance with embodiments of the present invention, described herein.

In some examples, the processor 710 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 710 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multi-threading. In some embodiments, the processor 710 is a microprocessor.

In an example embodiment, the processor 710 may be configured to execute instructions, such as computer program code or instructions, stored in the memory circuitry 720 or otherwise accessible to the processor 710. Alternatively or additionally, the processor 710 may be configured to execute hard-coded functionality. As such, whether configured by hardware or software instructions, or by a combination thereof, the processor 710 may represent a computing entity (e.g., physically embodied in circuitry) configured to perform operations according to an embodiment of the present invention described herein. For example, when the processor 710 is embodied as an ASIC, FPGA, or similar, the processor may be configured as hardware for conducting the operations of an embodiment of the invention. Alternatively, when the processor 710 is embodied to execute software or computer program instructions, the instructions may specifically configure the processor 710 to perform the algorithms and/or operations described herein when the instructions are executed. However, in some cases, the processor 710 may be a processor of a device (e.g., a mobile terminal or a fixed computing device) specifically configured to employ an embodiment of the present invention by further configuration of the processor using instructions for performing the algorithms and/or operations described herein. The processor 710 may further include a clock, an arithmetic logic unit (ALU) and logic gates configured to support operation of the processor 710, among other things.

The computing system 700 may optionally also include the communication circuitry 730. The communication circuitry may be any means embodied in either hardware or a combination of hardware and software that is configured to receive and/or transmit data from/to a network and/or any other device or module in communication with the computing system 700. In this regard, the communication interface may include, for example, supporting hardware and/or software for enabling communications. As such, for example, the communication circuitry 730 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system, comprising:
    a Mach-Zehnder modulator (MZM) structure that comprises:
        a first waveguide interferometer arm structure associated with a first semiconductor device; and
        a second waveguide interferometer arm structure associated with a second semiconductor device,
        wherein a polybinary electrical signal is applied to or between the first semiconductor device and the second semiconductor device to convert an input optical signal provided to the MZM structure into an optical PAM-4 signal.

2. A system, comprising:
    a first Mach-Zehnder modulator (MZM) structure that comprises:
        a first waveguide interferometer arm structure associated with a first semiconductor device; and
        a second waveguide interferometer arm structure associated with a second semiconductor device;
    a second MZM structure that comprises:
        a third waveguide interferometer arm structure associated with a third semiconductor device; and
        a fourth waveguide interferometer arm structure associated with a fourth semiconductor device;

a bias controller configured to apply a bias voltage to the first semiconductor device, the second semiconductor device, the third semiconductor device, and the fourth semiconductor device to configure the first MZM structure and the second MZM structure at a null operating point; and a bias electrode structure configured to adjust phase between a first optical duobinary signal provided by the first MZM structure and a second optical duobinary signal provided by the second MZM structure to facilitate generation of an optical PAM-4 signal.

3. The system of claim 2, wherein a first duobinary electrical signal is applied to or between the first semiconductor device and the second semiconductor device of the first MZM structure to convert a first portion of an input optical signal provided to the first MZM structure into the first optical duobinary signal, and wherein a second duobinary electrical signal is applied to or between the third semiconductor device and the fourth semiconductor device of the second MZM structure to convert a second portion of the input optical signal provided to the second MZM structure into the second optical duobinary signal.

4. The system of claim 3, further comprising:
an optical splitter configured to split the input optical signal into the first portion of the input optical signal provided to the first MZM structure and the second portion of the input optical signal provided to the second MZM structure.

5. The system of claim 3, further comprising:
an optical combiner configured to combine the first optical duobinary signal and the second optical duobinary signal into the optical PAM-4 signal.

6. A system, comprising:
a first Mach-Zehnder modulator (MZM) structure that comprises:
a first waveguide interferometer arm structure associated with a first semiconductor device; and
a second waveguide interferometer arm structure associated with a second semiconductor device,
wherein a first duobinary electrical signal is applied to or between the first semiconductor device and the second semiconductor device to convert a first portion of an input optical signal provided to the first MZM structure into a first optical duobinary signal;
a second MZM structure that comprises:
a third waveguide interferometer arm structure associated with a third semiconductor device; and
a fourth waveguide interferometer arm structure associated with a fourth semiconductor device,
wherein a second duobinary electrical signal is applied to or between the third semiconductor device and the fourth semiconductor device to convert a second portion of the input optical signal provided to the second MZM structure into a second optical duobinary signal; and
a bias electrode structure configured to adjust phase between the first optical duobinary signal associated with the first MZM structure and the second optical duobinary signal associated with the second MZM structure to facilitate generation of an optical PAM-4 signal.

7. The system of claim 6, further comprising:
a bias controller configured to apply a bias voltage to the first semiconductor device, the second semiconductor device, the third semiconductor device, and the fourth semiconductor device to configure the first MZM structure and the second MZM structure at a null operating point.

8. The system of claim 6, wherein the first optical duobinary signal comprises most significant bit data for the optical PAM-4 signal, and wherein the second optical duobinary signal comprises least significant bit data for the optical PAM-4 signal.

9. The system of claim 6, further comprising:
an optical splitter configured to split the input optical signal into the first portion of the input optical signal provided to the first MZM structure and the second portion of the input optical signal provided to the second MZM structure.

10. The system of claim 9, wherein the bias electrode structure is configured to apply a bias to the second optical duobinary signal to generate a phase-shifted version of the second optical duobinary signal, and wherein the system further comprising:
an optical combiner configured to combine the first optical duobinary signal and the phase-shifted version of the second optical duobinary signal into the optical PAM-4 signal.

11. The system of claim 6, wherein the bias electrode structure is a first bias electrode structure, and wherein the first semiconductor device is a first electro-absorption modulator and the second semiconductor device is a second electro-absorption modulator associated with a second bias electrode structure.

12. The system of claim 6, further comprising:
an optical splitter configured to split the input optical signal into the first portion of the input optical signal provided to the first MZM structure and the second portion of the input optical signal provided to the second MZM structure,
wherein the bias electrode structure is a first bias electrode structure, and wherein the first semiconductor device is a first electro-absorption modulator and the second semiconductor device is a second electro-absorption modulator associated with a second bias electrode structure.

13. The system of claim 6, further comprising:
a third MZM structure that comprises:
a fifth waveguide interferometer arm structure associated with a fifth semiconductor device; and
a sixth waveguide interferometer arm structure associated with a sixth semiconductor device; and
a fourth MZM structure that comprises:
a seventh waveguide interferometer arm structure associated with a seventh semiconductor device; and
an eighth waveguide interferometer arm structure associated with an eighth semiconductor device.

14. The system of claim 13, wherein the bias electrode structure is a first bias electrode structure, and wherein the system further comprises:
a second bias electrode structure configured to adjust phase between a third optical duobinary signal associated with the third MZM structure and a fourth optical duobinary signal associated with the fourth MZM structure.

15. The system of claim 14, wherein the first bias electrode structure is configured to apply a first bias to the second optical duobinary signal to generate a biased version of the second optical duobinary signal, wherein the second bias electrode structure is configured to apply a second bias to the fourth optical duobinary signal to generate a biased version of the fourth optical duobinary signal, and wherein the system further comprising:
  an optical combiner configured to combine the first optical duobinary signal, the biased version of the second optical duobinary signal, the third optical duobinary signal, and the biased version of the fourth optical duobinary signal into the optical PAM-4 signal.

16. The system of claim 15, further comprising:
a polarization rotator device configured to modify polarization of a combined optical duobinary signal associated with the third optical duobinary signal and the fourth optical duobinary signal.

17. The system of claim 16, wherein the optical PAM-4 signal is an optical polarization switched PAM-4 signal.

18. The system of claim 16, wherein the optical PAM-4 signal is an optical polarization multiplexed PAM-4 signal.

19. The system of claim 13, further comprising:
  a first optical splitter configured to split the input optical signal into the first portion of the input optical signal provided to the first MZM structure and the second portion of the input optical signal provided to the second MZM structure; and
  a second optical splitter configured to split the input optical signal into a third portion of the input optical signal provided to the third MZM structure and a fourth portion of the input optical signal provided to the fourth MZM structure.

* * * * *